US007449505B2

(12) United States Patent
Cheng et al.

(10) Patent No.: US 7,449,505 B2
(45) Date of Patent: Nov. 11, 2008

(54) METHOD OF MAKING POROUS MICROSPHERES WITH GEOMETRIC STANDARD DEVIATION OF 1.25 OR LESS

(75) Inventors: Chieh-Min Cheng, Rochester, NY (US); Mark A. Jackson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 627 days.

(21) Appl. No.: 11/133,197

(22) Filed: May 20, 2005

(65) Prior Publication Data

US 2006/0263590 A1 Nov. 23, 2006

(51) Int. Cl.
C08J 9/24 (2006.01)
C08J 9/28 (2006.01)
(52) U.S. Cl. .............................. 524/64; 521/65; 521/69
(58) Field of Classification Search ................. 427/212; 521/61, 64, 65, 69
See application file for complete search history.

(56) References Cited

U.S. PATENT DOCUMENTS

| | | | |
|---|---|---|---|
| 5,512,604 A * | 4/1996 | Demopolis | 521/142 |
| 5,853,943 A | 12/1998 | Cheng et al. | |
| 6,447,974 B1 * | 9/2002 | Chen et al. | 430/137.14 |
| 6,503,680 B1 * | 1/2003 | Chen et al. | 430/137.14 |
| 6,632,850 B2 * | 10/2003 | Hughes et al. | 521/82 |
| 6,841,580 B2 | 1/2005 | Inoue et al. | |
| 7,276,254 B2 * | 10/2007 | Burns et al. | 424/489 |
| 7,279,261 B2 * | 10/2007 | Lee et al. | 430/109.3 |

* cited by examiner

Primary Examiner—H. T Le
(74) Attorney, Agent, or Firm—Oliff & Berridge, PLC

(57) ABSTRACT

Porous polymer microspheres having a size of from about 3 to about 50 microns and a geometric standard deviation of about 1.25 or less are disclosed. The porous polymer microspheres are made by a method including the steps of preparing an emulsion comprised of polymer particles having an average particle size of less than about 3 microns and a diluent, subjecting the emulsion to an aggregating condition to form aggregated polymer particles, optionally coalescing the aggregated polymer particles, and removing the diluent to form the porous polymer microspheres.

10 Claims, 1 Drawing Sheet

METHOD OF MAKING POROUS MICROSPHERES WITH GEOMETRIC STANDARD DEVIATION OF 1.25 OR LESS

BACKGROUND

Described herein are porous microspheres having a size of from about 3 to about 50 microns and a narrow particle size distribution. Also described is an emulsion aggregation method for making such porous microspheres.

There are numerous applications for porous microspheres in chemistry, biochemistry and environmental engineering, including use in ion-exchangers, adsorbents and separation media. There is also a significant amount of biochemical research that benefits from the use of porous microspheres.

There has been an increasing interest in porous polymer particles in recent years. Especially, styrene-acrylate copolymers have been used as precursors for ion-exchangers, adsorbents and GPC column materials. Crosslinked polymer particles with a permanent macroporous structure are efficient materials for many separation processes. The macropores of the particles allow biomolecules, for example in the general size of 500,000 dalton, to be separated.

The preparation of porous microspheres in the size range of about 3 to about 50 microns with narrow particle size distributions is often difficult and expensive. Existing methods of preparing these materials are limited and often involve the use of size classification. Size classification is time consuming and wasteful, as a large percentage of the microspheres must be discarded as being too large or too small.

Porous polymer microspheres may be produced by suspension polymerization by adding an inert diluent to the polymerizing mixture. After polymerization, the inert diluent is removed, leaving a porous structure within the polymer particles. The suspension process gives relatively large particles (100-10,000 μm) with a broad particle size distribution, which is disadvantageous with regards to flow conditions, separation and packing efficiency. It is expected that the improved separation efficiency, optimal packing and lower backpressure can be achieved with narrower particle size distribution macroporous polymer particles as compared to polydisperse separation media.

U.S. Pat. No. 6,841,580 describes an organic porous material having a continuous pore structure, which comprises interconnected macropores and mesopores with a radius of 0.01 to 100 microns in the walls of the macropores, having a total pore volume of 1 to 50 ml/g and having pore distribution curve characteristics wherein the value obtained by dividing the half-width of the pore distribution curve at the main peak by the radius at the main peak is 0.5 or less. The organic porous material is useful as an adsorbent having high physical strength and excelling in adsorption amount and adsorption speed, an ion exchanger excelling in durability against swelling and shrinkage, and a filler for chromatography exhibiting high separation capability. See the Abstract.

A simple and economical process for preparing porous microspheres in the size range of from about 3 to about 50 microns that allows for control of size distribution is desired.

SUMMARY

What is sought, then, is an economical process for preparing narrow particle size distribution porous polymer particles in the size range of about 3 to about 50 microns. Such process would be very beneficial to at least ion-exchange, adsorbent, chromatography, bioprocessing, immobilized enzyme, drug delivery and catalysis fields.

In embodiments, described are porous polymer microspheres having a size of from about 3 to about 50 microns and a geometric standard deviation of about 1.25 or less.

In further embodiments, described are porous polymer microspheres comprised of emulsion aggregated crosslinked styrene-acrylate polymer and having a size of from about 3 to about 50 microns and a geometric standard deviation of about 1.25 or less.

In still further embodiments, described is a method of making porous polymer microspheres having an average size of from about 3 to about 50 microns and a geometric standard deviation of about 1.25 or less, comprising preparing an emulsion comprised of polymer particles having an average particle size of less than about 3 microns and a diluent, subjecting the emulsion to an aggregating condition to form aggregated polymer particles, optionally coalescing the aggregated polymer particles, and removing the diluent to form the porous polymer microspheres.

BRIEF DESCRIPTION OF THE DRAWING

The FIGURE is an SEM micrograph of 8.5 μm, narrow size distribution porous microspheres prepared by an emulsion aggregation process.

DETAILED DESCRIPTION OF EMBODIMENTS

Figure 1:
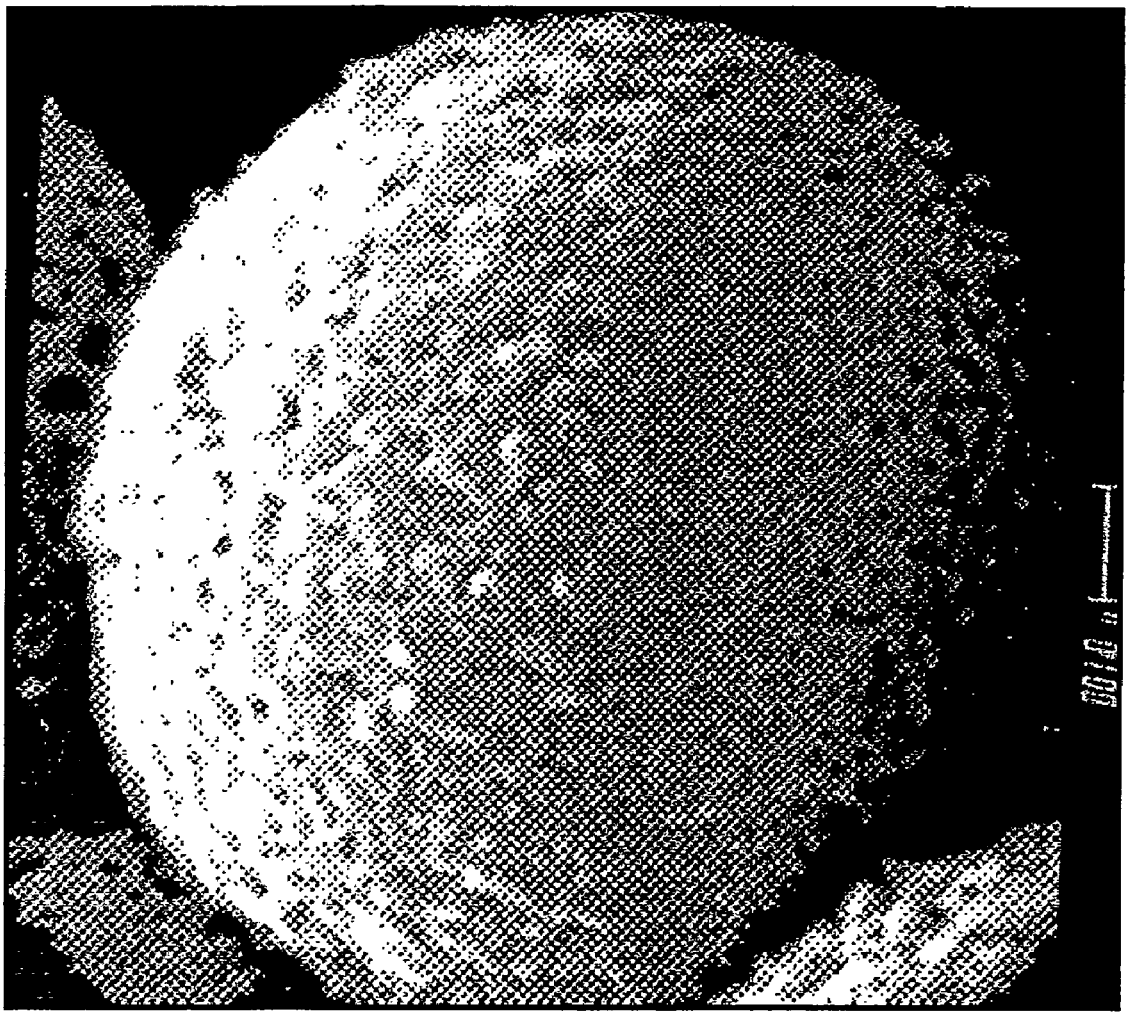

The porous polymer microspheres having a narrow particle size distribution and an average particle size of about 3 to about 50 microns are prepared by an emulsion aggregation (EA) process.

In embodiments, the process includes the steps of preparing an emulsion comprised of polymer particles having an average particle size of less than about 3 microns and a diluent, subjecting the emulsion to an aggregating condition to form aggregated polymer particles, optionally coalescing the aggregated polymer particles, and removing the diluent to form the porous polymer microspheres.

The emulsion of small sized polymer particles and diluent may be prepared by any suitable means without limitation. In a preferred embodiment, the emulsion is prepared by mixing a latex of the small sized polymer particles with an emulsion of the diluent.

The polymeric materials are preferably synthesized such that they are formed as emulsions in water or can be turned into emulsions in water though processes of heating in water, with or without surfactants or other stabilizers. The latex of small sized polymer particles is preferably derived via conventional emulsion polymerization techniques, although other techniques of preparing and/or dispersing the small sized polymer particles to form the latex may be used, e.g., polymer microsuspension, etc. In emulsion polymerization, one or more monomers are emulsified and then polymerized to form the small sized polymer particles as a latex. These small sized polymer particles will be aggregated to form the larger porous polymer particles. Thus, the small sized particles should have an average particle size less than 3 microns. Preferably, the small sized particles have an average size of from, for example, about 5 nm to about 1,000 nm.

The monomers used to form the polymer particles are not particularly limited. Suitable example monomers include styrene, acrylates, methacrylates, butadiene, isoprene, and optionally acid or basic olefinic monomers, such as acrylic acid, methacrylic acid, acrylamide, methacrylamide, quaternary ammonium halide of dialkyl or trialkyl acrylamides or methacrylamides, vinylpyridine, vinylpyrrolidone, vinyl-N-methylpyridinum chloride and the like, and mixtures thereof.

The presence of acid or basic groups in the monomers is optional, and such groups can be present in various amounts of from, for example, about 0.1 to about 10 percent by weight of the polymer resin. In a preferred embodiment, the monomer includes a mixture of styrene and acrylate monomers such that the polymer is a styrene acrylate.

In preferred embodiments, the polymer particles are crosslinked. This may be done by including one or more crosslinking monomers in the emulsion. Crosslinking monomers may include, for example, divinylbenzene or diethylene glycol methacrylate. The crosslinking monomer(s) may be included in effective amounts, for example from about 1 to about 20 percent by weight of the polymer resin.

In addition, chain transfer agents, for example dodecanethiol, water-soluble thiols such as butanethiol or propanethiol, or carbon tetrabromide, may also be included in the monomer emulsion, if desired, in order to control the molecular weight properties of the polymer. If present, the chain transfer agent(s) may be included in amounts of, for example, about 1 to about 10 percent by weight of the polymer resin.

The latex polymer particles derived are preferably comprised of a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid, poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid), and the like. Poly(styrene-alkyl acrylates) are preferred.

The emulsion polymerization process is well known, and need not be further described herein. Several U.S. patents describe suitable emulsion polymerization techniques. See, for example, U.S. Pat. No. 5,853,943, incorporated herein by reference in its entirety.

As the emulsifier or surfactant selected for the preparation of the latex, such may be of the formula

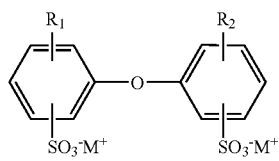

wherein $R_1$ or $R_2$ is hydrogen, or alkyl with, for example, from about 1 to about 25 carbons and preferably from about 6 to about 16 carbon atoms, and M is hydrogen, an alkali metal such as sodium or potassium, or ammonium ($NH_4$), with a preferred emulsifier being sodium tetrapropyl diphenyloxide disulfonate. For sodium n-decyl diphenyloxide disulfonate, $R_1$ is hydrogen, $R_2$ is a n-decyl group, and M is sodium. Examples of specific emulsifiers include sodium hexyl diphenyloxide disulfonate, sodium n-decyl diphenyloxide disulfonate, sodium n-dodecyl diphenyloxide disulfonate, sodium n-hexadecyl diphenyloxide disulfonate, sodium palmityl diphenyloxide disulfonate, n-decyl diphenyloxide disulfonic acid, n-dodecyl diphenyloxide disulfonic acid, and tetrapropyl diphenyloxide disulfonic acid. The emulsifiers or surfactants include diphenyloxide disulfonates, such as DOWFAX 2A1™, DOWFAX 3A2™, DOWFAX 8390™ available Dow Chemical, RHODACAL DSB™ available from Rhone-Poulenc, POLY-TERGENT 2A1™, POLY-TERGENT 2EP™ available from Olin, AEROSOL DPOS-45™ available from Cytec, CALFAX DBA-40™, CALFAX 16L-35™ available from Pilot Chemicals, and the like. Diphenyloxide disulfonate emulsifiers represent a class of highly anionic surface active agents consisting of disulfonated alkyl diphenyl oxide molecules in which the charge arises from two sulfonate groups rather than one as in the majority of surfactants (such as dodecylbenzene sulfonate), provides excellent emulsion stability. Diphenyloxide disulfonates also possess high oxidation resistance and high temperature stability up to, for example, 95° C., rendering them suitable for use in emulsion polymerization.

A diluent is added to the emulsion of small sized particles. The diluent should be inert to reaction with the polymer particles. The diluent will occupy areas within the aggregated polymer particles, thereby creating the macropores of the polymer particles upon removal of the diluent.

The diluents used are solvating or nonsolvating diluents (solvent or non-solvent) for polymer chains, or inert linear polymer. Examples of the inert diluents that may be used in the method include benzene, toluene, ethylbenzene, xylene, methylene chloride, ethylene chloride, n-hexane, n-heptane, i-octane, nonane, decane, dodecane, hexadecane, cyclohexane, 1-pentanol, 1-hexanol, 1-heptanol, 1-octanol, 1-decanol, 1-dodecanol, and the like.

In a preferred embodiment, the diluent is added as an emulsion. The chemically dispersed diluent emulsion is comprised of diluent and dispersant, wherein the dispersant is nonionic, ionic or a mixture of surfactants, for example, anionic DOWFAX 2A1™ and nonionic poly(N-vinyl pyrrolidone)).

A sufficient amount of diluent is added to the polymer particle latex such that the ultimate particles will have a porosity of, for example, about 10% to about 75%, preferably from about 30% to about 50%. The ratio of diluent to polymer particles on a weight basis may be, for example, about 0.3 to about 3 to 1, preferably from about 0.5 to about 2 to 1.

The emulsion of polymer particles and diluent is then subjected to an aggregation condition in order to aggregate the small sized polymer particles into larger sized polymer particles. In general, the aggregating condition includes at least the addition of an aggregating agent or coagulant to the emulsion. As the aggregating agent, mention may be made of a metal salt, a polymeric salt, or an ionic material that would cause flocculation and aggregation of the polymer particles. Specific non-limiting examples include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate and the like.

The aggregating agent may be added to the emulsion in bulk, or may be metered in during aggregation. Preferably, the aggregating agent is added in an amount of about 0.05 pph to about 5 pph of the polymer. More in particular, in embodiments, the aggregating agent is added in amounts of from about 0.01 to about 5% by weight of the polymer, preferably from about 0.5 to about 2.5% by weight of the polymer.

Additional aggregating conditions may include application of heat and control of mixing and pH conditions.

For example, the growth and shaping of the particles following addition of the aggregating agent may be accomplished under conditions in which aggregation occurs separate from coalescence or conditions under which aggregation and coalescence occur continuously together. For separate aggregation and coalescence particle formation steps, the aggregation is preferably conducted under shearing conditions (e.g., mixing at about 100 to about 5,000 revolutions per minute using any suitable device and equipment, for example, using an IKA ULTRA TURRAX T50 probe homogenizer) at a temperature of from about 25° C. to about 75° C. For example, the polymer particles are preferably aggregated at a temperature below the glass transition (Tg) temperature of the polymer, for example at a temperature of from about 15° C. to about 1° C. below the Tg of the polymer particles. Following aggregation to the desired particle size, the particles may optionally be coalesced to a desired final shape, coalescence being used to render the particles more spherical. Coalescence may be effected by heating the mixture to a temperature of from about 75° C. to about 115° C. Coalescence may also be conducted with lowering the pH to about 1.5 to about 6.0, more preferably the pH is lowered from about 2.5 to about 5.5, with an acid.

When the aggregation is effected at substantially the same time the particles are being coalesced, then the mixture is preferably heated to about 75° C. to about 115° C.

The particles are permitted to aggregate until a predetermined desired particle size is obtained. The particle size may be monitored during the growth process until such particle size is reached. Samples may be taken during the growth process and analyzed, e.g., with a Coulter Counter, for average particle size. Once the predetermined desired particle size is reached, then the growth process is halted. In preferred embodiments, the predetermined desired particle size is within the range of about 3 to about 50 microns, preferably about 5 to about 20 microns.

Upon the particles reaching the predetermined desired particle size, further growth of the particles is halted. This may be done by, for example, adjusting the pH or adding an agent that scavenges remaining aggregating agent. For example, when the aggregates approach the required size (i.e., from about 3 to about 50 microns in volume average diameter), growth may be hindered through adjustment of the pH (i.e., the pH about 4.0 to about 9.0, more particularly the pH about 5.0 to about 6.5) with a known caustic agent such as sodium hydroxide.

Once the microspheres have the desired size and shape, the particle slurry is cooled to an appropriate working temperature, such as 30° C., more particularly, the temperature is about 10° C. to about 50° C. Then, the inert diluent is removed from the polymer particles. Preferably, the removal is effected by subjecting the polymer microspheres to extraction with non-solvent such as methanol, e.g., in a Soxhlet apparatus, for a period of time, for example for about 1 to 36 hours, to remove the inert diluent. Other non-solvents that may be used include, but are not limited to, ethanol, 2-propanol, 2-methoxyethanol, 2-ethoxyethanol, acetic acid, acetone, and the like. During the extraction process, the microspheres are added to the non-solvent at low concentration, for example at a microsphere to non-solvent ratio of 5% or less.

Once the diluent is removed to generate the porous polymer particles, the polymer particles are optionally washed with water, for example to remove residual non-solvent and other impurities, surfactants, etc., and dried.

The polymer particles achieved are thus porous, and have an average size of from about 3 to about 50 microns and a narrow particle size distribution. Such narrow particle size distribution porous microspheres have been applied in size exclusion chromatography. The particles give superior efficiency in packing, speed, and resolution as compared with systems using wide particle size distribution particles.

The particle size of the porous microspheres is thus about 3 to about 50 microns, preferably about 5 to about 20 microns. The particle size distribution (geometric standard deviation) is preferably less than 1.25, preferably from about 1.15 to about 1.25, for example as determined by a Layson Cell particle analyzer. The emulsion aggregation technique permits the porous particles to have such size and narrow particle size distribution without the need for time consuming and expensive post-processing of the particles.

Preferably, the porous microspheres have an average pore size larger than 500 Å in diameter, a pore volume of about 0.4 to about 0.7 ml/g, and a porosity of about 30 to about 50%, for example as determined by mercury intrusion porosimetry. Further, the porous microspheres also have internal surface areas in the 15 to about 60 $m^2/g$ range, for example as determined by the Brunauer, Emmett and Teller (BET) method.

The porous microspheres in embodiments may optionally contain monomers that result in the presence of functional groups on the surface of the microspheres formed, and/or further chemical treatment of the microspheres may be performed to create such functional groups on the surface. Such functional groups can be useful to enable the covalent bonding or complexation of radioactive materials, biological materials, or ligands for attaching radioactive or biological materials. As suitable monomers and surface treatment materials that provide appropriate functional groups, mention may be made of functional monomers such as styrene, vinyltoluene, sulfonated styrene, methyl methacrylate, ethyl methacrylate, 2-hydroxyethyl acrylate, 2-hydroxyethyl methacrylate, vinyl acetate, acrylic acid, methacrylic acid, β-carboxyethyl acrylate, acrylamine, methacrylamide, quartenary ammonium halide of dialkyl or trialkyl acrylamides or methacrylamides, vinylpyridine, vinylpyrrolidone and vinyl-N-methylpyridinum, and mixtures thereof.

Post-copolymerization of functional monomers with residual double bonds of porous polymer microspheres containing divinylbenzene or diethylene glycol methacrylate may also be used for grafting functional groups, provided the grafted monomer is copolymerized with styrene or acrylate-like units. The functional groups grafted on the surface can be —C—O—, —C=O, —O—C=O, —C—O—O, —C—N, —C=N, —C≡N, —NH, —NH2, —CF, —$CF_2$, —$CF_3$, or —$SO_3$. These double bonds should be at least partly reacted, for example undergoing cationic polymerization during chloromethylation by chloromethylether in the presence of Friedel-Crafts catalysts.

The FIGURE is an SEM micrograph of an 8.5 μm narrow size distribution porous crosslinked styrene-acrylate polymer microsphere prepared by the emulsion aggregation process. N-heptane was used as inert diluent. Divinylbenzene in an amount of 10 wt % is used to prepare the crosslinked styrene-acrylate polymer. The GSD of the porous microspheres is about 1.18, as determined by the Layson Cell particle analyzer. The porous microspheres possess an average pore size of 560 Å in diameter, a pore volume of 0.62 ml/g, and a porosity of 44%, as determined by mercury intrusion porosimetry. The porous microspheres have internal surface areas of 54 $m^2$/g as determined by BET method.

Embodiments are further illustrated by way of the following non-limiting examples.

EXAMPLE 1

Crosslinked Polymer Latex Synthesis

This example illustrates a method of preparing a poly(styrene-butyl acrylate-β-carboxyethyl acrylate-divinylbenzene) polymer latex.

A polymer latex (EP611) comprised of a styrene/n-butyl acrylate/β-carboxyethyl acrylate/divinylbenzene copolymer of 74:13:3:10 prepared with 1.7 pph dodecanethiol (chain transfer agent), 0.35 pph branching agent (A-DOD, decanediol diacrylate, available from Shin-Najamura Co., Japan) and 1.5 percent of ammonium persulfate initiator was synthesized by a semicontinuous emulsion polymerization process using the anionic surfactant DOWFAX 2A1™ (sodium tetrapropyl diphenoxide disulfonate, 47 percent active, available from Dow Chemical).

In a 3 gallon jacketed stainless steel reactor with double flight impellers (a four pitched-blade impeller each) set at 35 rpm, 3.87 kilograms of deionized water with 5.21 grams of DOWFAX 2A1™ (7 percent of the total surfactant) was charged while the temperature was raised from room, about 23 to about 25° C., to 80° C. A monomer emulsion was prepared by mixing a monomer mixture (3,105 grams of styrene, 545 grams of n-butyl acrylate, 126 grams of β-carboxyethyl acrylate (β-CEA), and 420 grams of divinylbenzene (55% active, available from Dow Chemical)), 14.3 grams of A-DOD and 45 grams of 1-dodecanethiol with 1,930 grams of deionized water and 80.7 grams of DOWFAX 2A1™ (93 percent of the total surfactant) at room temperature for 30 minutes in a 1.5 gallon Pope tank. 63 grams of the seed were pumped from the monomer emulsion into a 0.2 gallon beaker and subsequently the seed was charged into the reactor at 80° C. An initiator solution prepared from 61 grams of ammonium persulfate in 302 grams of deionized water was added over 20 minutes after the seed emulsion addition. The reactor was stirred at 48 rpm for an additional 20 minutes to allow seed particle formation at 80° C. The monomer emulsion was then fed into the reactor. Monomer emulsion feeding was stopped after 110 minutes and 24.9 grams of 1-dodecanethiol (DDT) were added to the remaining emulsion in the 1.5 gallon Pope tank which was mixed for a further 5 minutes before feeding resumed. The remaining monomer emulsion was fed into the reactor over 90 minutes. At the end of the monomer feed, the emulsion was post-heated at 80° C. for 180 minutes, then cooled to 25° C. The reaction system was deoxygenated by passing a stream of nitrogen through it during the reaction.

A latex resin containing 42 weight percent styrene-butyl acrylate-β-carboxyethyl acrylate-divinylbenzene resin, 57 weight percent water, 0.4 weight percent anionic surfactant DOWFAX 2A1™, and 0.6 percent of an ammonium sulfate salt species was obtained. The resulting crosslinked polymer poly(styrene-butyl acrylate-acrylic acid-β-carboxyethyl acrylate-divinylbenzene) possessed a mid-point Tg of 70.7° C., as measured on a Seiko DSC. The latex resin or polymer possessed a volume average diameter of 252 nanometers as measured by light scattering technique on a Coulter N4 Plus Particle Sizer.

EXAMPLE 2

Diluent Emulsion Preparation

An aqueous diluent emulsion (DE742) containing n-heptane and a surfactant in water is generated using a homogenization process. 300 grams of n-heptane, 218.8 grams of a surfactant aqueous solution containing 27.0 grams of the anionic surfactant DOWFAX 2A1™, and 981 grams of deionized water are dispensed into a beaker and stirred with the aid of a mechanical stirrer to mix the dry pigment powder, water and DOWFAX 2A1™ solution mixture. The resultant diluent mixture is predispersed for about 5 minutes using an IKA ULTRA TURRAX® T50 homogenizer (IKA Labortechnik, Germany) operating at a speed starting at about 4,000 revolutions per minute and ending at about 7,000 revolutions per minute. The resulting predispersed diluent mixture is then poured into the feed hopper of a Rannie Lab 2000 homogenizer (APV Homogenizer Group, USA).

The homogenizer is activated to pump the polymer mixture through the homogenizer at a rate of about 11 liters per hour. The product is collected in a product container wherein the container is cooled by means of an ice bath. Initially, the homogenizer primary and secondary valves are kept fully open. When the diluent mixture is being pumped steadily through the homogenizer, the homogenizer primary valve is closed to increase the pressure drop in the valve to about 50 megapascals. When the feed hopper is nearly empty, the homogenized product in the product container is poured back into the feed hopper, and the homogenizer primary valve is further closed to increase the pressure drop in the valve to a final set point of about 150 megapascals. In total, the diluent mixture was pumped through the homogenizer 28 times at a pressure of 150 megapascals. At the completion of homogenization, the homogenizer primary valve is opened and the homogenizer is disengaged.

The product is comprised of a surfactant stabilized diluent emulsion comprising 20.5 weight percent of n-heptane, 1.85 weight percent of DOWFAX 2A1™ surfactant, and 77.65 weight percent of water. The diluent emulsion has a volume median diameter of 312 nanometers as measured by light scattering technique on a Coulter N4 Plus Particle Sizer.

EXAMPLE 3

Narrow Size Porous Polymer Microsphere Preparation

This example illustrates preparation of 8.5 micron narrow size porous polymer microspheres generated by PAC aggregation/coalescence.

The poly(styrene-butyl acrylate-β-carboxyethyl acrylate-divinylbenzene) polymer latex of Example 1 (EP611) and diluent emulsion of Example 2 (DE742) above were utilized in an aggregation/coalescence (A/C) process to produce 8.5 micron (volume average diameter) particles with a narrow size distribution.

500 grams of deionized water was placed in a stainless steel beaker and homogenized at 5,000 rpm, while there was added 300 grams of latex poly(styrene-butyl acrylate-β-carboxyethyl acrylate-divinylbenzene) (EP611), followed by the addition of 292 grams of diluent emulsion (DE742). To the resulting homogenized latex/diluent blend, 2.4 grams of 10 percent PAC (polyaluminum chloride obtained from Asada Company of Japan) solution diluted with 24 grams of 0.02N $HNO_3$ was added dropwise to cause a flocculation of the crosslinked polymer latex and the n-heptane diluent emulsion. After the addition was complete, homogenization was continued for an additional 2 minutes to form a creamy blend with an average particle size by volume of 2.53 and with a GSDv of 1.20.

The creamy blend was then transferred into a 2 liter glass reactor and stirred at 350 rpm, while being heated to about 62° C. to about 63° C. Particle growth was monitored during heating. When the particle size diameter of the solids by volume was equal to 8.8 (GSDv=1.18), the pH of the slurry was adjusted. The pH was adjusted to 7.5 by the addition of a 2 percent NaOH solution and the speed in the reactor was reduced to 200 rpm. After ½ hour of stirring at 63° C., the temperature in the reactor was increased to 83° C. After 1 hour of heating at 83° C., the pH of the slurry was adjusted to 4.3 and the heating was continued for an additional 10 hours. Thereafter, the reactor contents were cooled down to about room temperature, about 23° C. to about 25° C., and were discharged.

A 16 percent solids slurry of 8.6 micron polymer microspheres with GSDv=1.19 was obtained. The resulting polymer microsphere product was comprised of about 31 percent of n-heptane, about 0.2 weight percent of PAC and about 68.8 percent by weight of the resin poly(styrene-butyl acrylate-β-carboxyethyl acrylate-divinylbenzene), and the total amount of the polymer microsphere components was about 100 percent.

After emulsion/aggregation process, the polymer microspheres were extracted with methanol (a non-solvent for polystyrene) in a Soxhlet apparatus for 24 hours to remove the inert diluent (n-heptane), followed by washing with water to remove residual methanol. During the extraction process, the microspheres were added to methanol at low concentration (microsphere/methanol ratio of about 5%). The resulting porous microspheres are then washed with water to remove impurities, surfactants, etc., and dried at room temperature (about 23° C.).

The resulting 8.5 μm narrow size distribution porous microspheres were prepared by the EA (emulsion aggregation) process, by the use of n-heptane as inert diluent. The GSD the porous microspheres is about 1.18, as determined by the Layson Cell particle analyzer. The porous microspheres possess an average pore size of 560 Å in diameter, a pore volume of 0.62 ml/g, and a porosity of 44%, as determined by mercury intrusion porosimetry on a Micrometritics AutoPore 9200 porosimeter (Micrometritics Co.). The porous microspheres have internal surface areas of 54 $m^2/g$ as determined by Brunauer, Emmett and Teller (BET) method in a Quantasorb Sorption System (Quantachrome Corp., Model OS-9).

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of making porous polymer microspheres having an average size of from about 3 to about 50 microns and a geometric standard deviation of about 1.25 or less, comprising preparing an emulsion comprised of polymer particles having an average particle size of less than about 3 microns and a diluent, subjecting the emulsion to an aggregating condition to form aggregated polymer particles, optionally coalescing the aggregated polymer particles, and removing the diluent to form the porous polymer microspheres.

2. The method according to claim 1, wherein the method further comprises preparing the polymer particles having an average size of less than about 3 microns as a latex by forming an emulsion of one or more monomers and polymerizing the one or more monomers.

3. The method according to claim 2, wherein the one or more monomers include a crosslinking monomer such that the polymer particles are crosslinked.

4. The method according to claim 1, wherein a ratio of diluent to polymer particles on a weight basis is from about 0.3 to 1 to about 3 to 1.

5. The method according to claim 1, wherein the diluent is selected from the group consisting of benzene, toluene, ethylbenzene, xylene, methylene chloride, ethylene chloride, n-hexane, n-heptane, i-octane, nonane, decane, dodecane, hexadecane, cyclohexane, 1-pentanol, 1-hexanol, 1-heptanol, 1-octanol, 1-decanol and 1-dodecanol.

6. The method according to claim 1, wherein the diluent is added as an emulsion of the diluent with a dispersant.

7. The method according to claim 1, wherein the aggregating condition comprises heating the emulsion in the presence of an aggregating agent in the emulsion.

8. The method according to claim 1, wherein aggregation of the polymer particles is stopped by adjustment of pH when the polymer particles have reached a desired average particle size.

9. The method according to claim 1, wherein the removal of the diluent comprises extracting the diluent with a non-solvent.

10. The method according to claim 1, wherein the porous polymer microspheres include, or are treated to include, functional groups on the surfaces thereof.

* * * * *